(12) United States Patent
Brunner et al.

(10) Patent No.: US 8,245,152 B2
(45) Date of Patent: Aug. 14, 2012

(54) METHOD AND APPARATUS TO ACCELERATE SCROLLING FOR BUFFERED WINDOWS

(75) Inventors: Ralph T. Brunner, Santa Clara, CA (US); Haroon Sheikh, Cupertino, CA (US); Peter Graffagnino, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 12/885,312

(22) Filed: Sep. 17, 2010

(65) Prior Publication Data

US 2011/0072389 A1    Mar. 24, 2011

Related U.S. Application Data

(63) Continuation of application No. 11/998,536, filed on Nov. 29, 2007, now Pat. No. 7,802,196, which is a continuation of application No. 10/384,317, filed on Mar. 6, 2003, now Pat. No. 7,313,764.

(51) Int. Cl.
*G06F 3/048* (2006.01)
*G06F 3/00* (2006.01)

(52) U.S. Cl. ........ 715/784; 345/545; 345/684; 345/686; 715/786; 715/806

(58) Field of Classification Search .................. 715/781, 715/784, 786, 806
See application file for complete search history.

(56) References Cited

U.S. PATENT DOCUMENTS

| | | | |
|---|---|---|---|
| 4,442,495 A | 4/1984 | Sukonic | |
| 4,602,251 A | 7/1986 | Sawada et al. | |
| 4,611,202 A | 9/1986 | DiNitto et al. | |
| 4,663,617 A | 5/1987 | Stockwell | |
| 4,823,108 A | 4/1989 | Pope | |
| 4,827,249 A | 5/1989 | Chauvel et al. | |
| 4,845,631 A | 7/1989 | Bottorf | |
| 4,958,378 A | 9/1990 | Bell | |
| 4,961,071 A | 10/1990 | Krooss | |
| 4,994,912 A | 2/1991 | Lumelsky et al. | |
| 5,038,138 A | 8/1991 | Akiyama et al. | |
| 5,043,923 A | 8/1991 | Joy et al. | |
| 5,050,102 A | 9/1991 | Sun et al. | |
| 5,065,368 A | 11/1991 | Gupta et al. | |
| 5,208,588 A | 5/1993 | Nishiyama | |
| 5,245,702 A | 9/1993 | McIntyre et al. | |
| 5,255,361 A | 10/1993 | Callaway et al. | |
| 5,274,753 A | 12/1993 | Roskowski et al. | |
| 5,317,306 A | 5/1994 | Abraham et al. | |
| 5,333,247 A | 7/1994 | Gest et al. | |
| 5,341,466 A | 8/1994 | Perlin et al. | |
| 5,363,483 A | 11/1994 | Jones et al. | |
| 5,384,909 A | 1/1995 | Brown | |
| 5,388,200 A | 2/1995 | McDonald et al. | |

(Continued)

*Primary Examiner* — Steven B Theriault
(74) *Attorney, Agent, or Firm* — Blakely, Sokoloff, Taylor & Zafman LLP

(57) ABSTRACT

Methods and apparatuses to accelerate scrolling for buffered windows. In one aspect of the invention, a method to scroll a buffered window on a data processing system includes: determining a second region of a second pixel image of a window in a frame buffer, which corresponds to a first region of a first pixel image of the window buffered in a window buffer that is scrolled from a first position to a second position in the first pixel image of the window in the window buffer; and scrolling the second region in the frame buffer to synchronize the second pixel image in the frame buffer with the first pixel image in the window buffer. In one example according to this aspect, the second region in the frame buffer is scrolled using graphics hardware; the frame buffer is located inside a video memory under control of the graphics hardware.

16 Claims, 11 Drawing Sheets

U.S. PATENT DOCUMENTS

| | | |
|---|---|---|
| 5,402,147 A | 3/1995 | Chen et al. |
| 5,434,591 A | 7/1995 | Goto et al. |
| 5,448,264 A | 9/1995 | Pinedo et al. |
| 5,493,641 A | 2/1996 | Brown |
| 5,500,923 A | 3/1996 | Kuroshima et al. |
| 5,515,494 A | 5/1996 | Lentz |
| 5,524,200 A | 6/1996 | Orton et al. |
| 5,528,751 A | 6/1996 | Priem et al. |
| 5,544,301 A | 8/1996 | Orton et al. |
| 5,579,473 A | 11/1996 | Schlapp et al. |
| 5,600,825 A | 2/1997 | Atkins et al. |
| 5,682,178 A | 10/1997 | Gibert et al. |
| 5,742,797 A | 4/1998 | Celi et al. |
| 5,745,098 A | 4/1998 | Yamaji |
| 5,754,161 A | 5/1998 | Noguchi et al. |
| 5,757,381 A | 5/1998 | Shoji et al. |
| 5,768,491 A | 6/1998 | Lobodzinski et al. |
| 5,771,047 A | 6/1998 | Ohba et al. |
| 5,798,749 A | 8/1998 | Minematsu et al. |
| 5,805,133 A | 9/1998 | Priem et al. |
| 5,825,363 A | 10/1998 | Anderson |
| 5,867,158 A | 2/1999 | Murasaki et al. |
| 5,872,872 A | 2/1999 | Kajiwara |
| 5,874,936 A | 2/1999 | Berstis et al. |
| 5,877,761 A | 3/1999 | Shoji et al. |
| 5,877,762 A | 3/1999 | Young |
| 5,914,711 A | 6/1999 | Mangerson et al. |
| 5,969,721 A | 10/1999 | Chen et al. |
| 5,977,970 A | 11/1999 | Amro et al. |
| 5,995,120 A | 11/1999 | Dye |
| 6,005,572 A | 12/1999 | Kurihara |
| 6,016,145 A | 1/2000 | Horvitz et al. |
| 6,067,068 A | 5/2000 | Hussain |
| 6,072,506 A | 6/2000 | Schneider |
| 6,075,532 A | 6/2000 | Colleran et al. |
| 6,078,306 A | 6/2000 | Lewis |
| 6,081,279 A | 6/2000 | Reddy |
| 6,317,135 B1 | 11/2001 | Reddy |
| 6,411,302 B1 | 6/2002 | Chiraz |
| 6,496,870 B1 | 12/2002 | Faustini |
| 6,567,091 B2 | 5/2003 | Dye et al. |
| 6,570,579 B1 | 5/2003 | MacInnis et al. |
| 6,587,112 B1 | 7/2003 | Goeltzenleuchter et al. |
| 6,590,592 B1 | 7/2003 | Nason et al. |
| 6,608,630 B1 | 8/2003 | MacInnis et al. |
| 6,630,945 B1 | 10/2003 | MacInnis et al. |
| 6,657,621 B2 | 12/2003 | Staudacher |
| 6,657,639 B2 | 12/2003 | Yu |
| 6,670,959 B2 | 12/2003 | Wasserman et al. |
| 6,677,950 B1 | 1/2004 | Ohba et al. |
| 6,784,881 B2 | 8/2004 | Wasserman et al. |
| 6,801,219 B2 | 10/2004 | Colavin |
| 6,833,834 B2 | 12/2004 | Wasserman et al. |
| 6,864,900 B2 | 3/2005 | Wasserman et al. |
| 6,870,538 B2 | 3/2005 | MacInnis et al. |
| 6,888,551 B2 | 5/2005 | Willis et al. |
| 6,915,401 B2 | 7/2005 | Broussard et al. |
| 6,924,813 B2 | 8/2005 | Selig et al. |
| 6,966,036 B2 | 11/2005 | Nason et al. |
| 6,975,324 B1 | 12/2005 | Valmiki et al. |
| 6,995,771 B2 | 2/2006 | Willis et al. |
| 7,050,073 B2 | 5/2006 | Abler |
| 7,079,160 B2 | 7/2006 | Colavin |
| 2002/0063737 A1 | 5/2002 | Feig et al. |
| 2002/0105525 A1 | 8/2002 | Abler |
| 2002/0135585 A1 | 9/2002 | Dye et al. |
| 2002/0163512 A1 | 11/2002 | Staudacher |
| 2003/0025716 A1 | 2/2003 | Colavin |
| 2003/0043155 A1 | 3/2003 | Wasserman et al. |
| 2003/0043158 A1 | 3/2003 | Wasserman et al. |
| 2003/0043173 A1 | 3/2003 | Wasserman et al. |
| 2003/0103062 A1 | 6/2003 | Lee et al. |
| 2003/0107578 A1 | 6/2003 | Willis et al. |
| 2003/0137528 A1 | 7/2003 | Wasserman et al. |
| 2003/0174136 A1 | 9/2003 | Emberling et al. |
| 2003/0189571 A1 | 10/2003 | MacInnis et al. |
| 2003/0206174 A1 | 11/2003 | MacInnis et al. |
| 2004/0133855 A1 | 7/2004 | Blair et al. |
| 2004/0212734 A1 | 10/2004 | MacInnis et al. |
| 2005/0091576 A1 | 4/2005 | Relyea et al. |
| 2006/0031854 A1 | 2/2006 | Godwin |

METHOD AND APPARATUS TO
ACCELERATE SCROLLING FOR BUFFERED
WINDOWS

CROSS-REFERENCE TO RELATED
APPLICATIONS

This application is a continuation of U.S. application Ser. No. 11/998,536 filed Nov. 29, 2007 now U.S. Pat. No. 7,802,196, which is a continuation of U.S. application Ser. No. 10/384,317 filed Mar. 6, 2003, now issued as U.S. Pat. No. 7,313,764.

FIELD OF THE INVENTION

The invention relates to graphical user interfaces for data processing systems, and more particularly to scrolling buffered windows using graphics hardware.

BACKGROUND OF THE INVENTION

In a Graphical User Interface (GUI), when a window has more displayable contents than can be displayed within the visible area of the window, only a portion of the contents is displayed on the window. A scrolling operation is then typically used for a user to view different portions of the contents in the limited visible area of the window. For example, a user can use a scroll bar to scroll the window to see a different portion of the contents. Other user interactions can also cause scrolling in the window. For example, auto scrolling may occur when the user drags an item to a location near (or on) a scroll bar or a border of the window so that the user can select a desirable location for dropping the dragged item.

FIG. 2 illustrates a buffered window system. In a buffered window system, applications draw contents for their windows in the window buffers; and the window system combines the images of the corresponding windows buffered in window buffers into a frame buffer to display the windows on the screen. For example, application software 201 draws content into window buffer 215, which is typically allocated from system memory 211 (e.g., volatile RAM 105 in FIG. 1). When the size of the window is changed (for example when it is enlarged), a new window buffer is allocated from the system memory to replace the old one in order to accommodate the window of the new size. Frame buffer 221 contains data for the screen image of the windows that are displayed on the screen of display device 205. When the window for application software 201 is moved on the screen, the content in the window is not changed; and the application software does not have to update window buffer 215. The window system copies the data in the window buffer to the correct position in frame buffer 221 to display the window in the new location on the screen. When the window is partially covered by other windows, a portion of data in window buffer 215 is copied onto the frame buffer to display the corresponding portion of the window that is visible. Frame buffer 221 is typically under control of graphics hardware 203 (e.g., graphics/video card, or display controller 108 as shown in FIG. 1), which controls the display of the windows on the screen of display device 205 using the data in the frame buffer.

Thus, in a buffered window system, operations for creating the contents in windows are separated from operations for composing a screen image from images of windows for different applications. Applications create (or update) images of the windows (contents for the windows) in window buffers; and the window system composes a screen image from the images of the windows in the window buffers. The window buffers are independent from the frame buffer.

In a non-buffered window system, an application draws content directly into the frame buffer. For example, when a user moves a top window to reveal a portion of a bottom window, the application for the bottom window must draw the revealed portion. When a window is scrolled, graphics hardware can be used to scroll the content in the frame buffer to update a portion of the window; and the corresponding application can then draw other portions of the window to update the image of the window on the frame buffer. Since graphics hardware can scroll the frame buffer much faster than the application redraws the corresponding portion, using graphics hardware to scroll can accelerate the scrolling operation.

FIGS. 3-4 show a scenario to scroll a window in a non-buffered window system. In FIG. 3, an application draws the image of window 303 directly on frame buffer 301. Areas 309 (A1) and 307 (A2) are shown in window 303. When cursor 305 pulls down thumb 311 of scroll bar 313 (e.g., in response to when a user presses and holds down a mouse button and moves the mouse while the cursor is over the thumb), window 303 is scrolled upward. When cursor 305 is moved to the position of cursor 405 in FIG. 4, scroll bar area 413 and thumb 411 are redrawn to indicate the size and the position of the visible portion of the contents in window 403 with respect to the entire contents. Area A2 is scrolled from the position of area 307 in FIG. 3 to the position indicated by area 407 in FIG. 4; and area 409 (A3) is revealed. Thus, after graphics hardware moves (scrolls) the data in frame buffer 301 for area A2, the corresponding application redraws area A3 (409) so it can be displayed, as shown in FIG. 4.

To scroll a window in a buffered window system, the window buffer is updated when the application scrolls the window. The change is buffered into the window buffer until the window flush occurs, which is an operation to synchronize the frame buffer with the window buffer in order to present the image of the window on the screen. Typically, the window system copies the data from the window buffer to the frame buffer to synchronize the frame buffer with the window buffer. After the synchronization operation, the effect of the scrolling operation is visible on the screen.

SUMMARY OF THE DESCRIPTION

Methods and apparatuses to accelerate scrolling for buffered windows using graphics hardware are described here.

At least one embodiment of the present invention accelerates scrolling in a buffered window system using graphics hardware, where regions in the frame buffer that can be scrolled using graphics hardware are determined from information of the operations performed on the window before the changes on the window buffer of the window are flushed to the frame buffer.

In one aspect of the invention, a method to scroll a buffered window on a data processing system includes: determining a second region of a second pixel image of a window in a frame buffer, which corresponds to a first region of a first pixel image of the window buffered in a window buffer that is scrolled from a first position to a second position in the first pixel image of the window in the window buffer; and scrolling the second region in the frame buffer to synchronize the second pixel image in the frame buffer with the first pixel image in the window buffer. Thus, a scrollable region that can be scrolled in a frame buffer to synchronize the frame buffer with the window buffer is identified for scrolling in the frame buffer. In one example according to this aspect, the second region in the frame buffer is scrolled using graphics hardware;

and, the frame buffer is located inside a video memory (which is used to drive a display device) under control of the graphics hardware.

The locations of dirty regions, regions where the frame buffer has not been updated according to the window buffer, are updated, in one embodiment, after the first region is scrolled in the window buffer. In one example, to flush a third region that is updated in the window buffer before the first region is scrolled in the window buffer, a location of the third region of the first pixel image relative to the first pixel image after the first region is scrolled is determined. The third region in the window buffer corresponds to a fourth region in the second pixel image in the frame buffer; and the data for the third region at that location in the window buffer is copied to the frame buffer to update the fourth region in the frame buffer. In one example, the data for the third region is copied after the second region is scrolled in the frame buffer. In another example, the fourth region is within the second region in the frame buffer; and, the data for the third region is copied before the second region is scrolled.

The geometries of the window as displayed in the frame buffer are taken into account when determining the second region for scrolling. In one example, before being scrolled the second region is within a first geometry of the window as displayed in the frame buffer where the frame buffer is previously updated according to the window buffer; and after being scrolled the second region is within a second geometry of the window as displayed in the frame buffer when the frame buffer is currently updated according to the window buffer. In one example, when scrolled a portion of the second region is outside the first geometry but still within the second geometry. A scrolled region that is not within the first geometry in the frame buffer before scrolling does not have valid data in the frame buffer for scrolling; and the corresponding data is copied from the window buffer to the frame buffer. In one example, a fifth region is determined in the first pixel image in the window buffer, which scrolls with the first region and, before being scrolled, corresponds to a sixth region in the frame buffer that is within the second geometry but outside the first geometry; and the data for the fifth region is copied from the window buffer to the frame buffer to update the sixth region.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
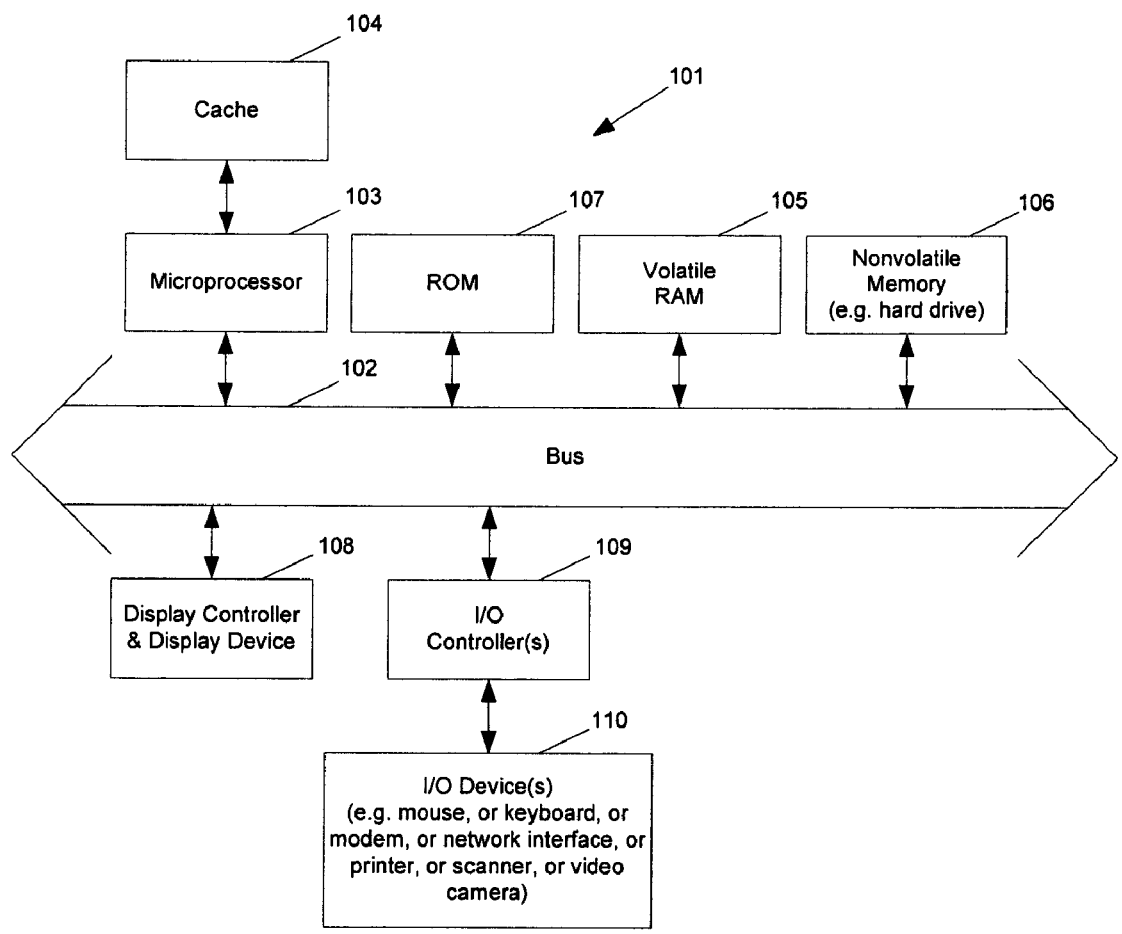
FIG. 1 shows a block diagram example of a data processing system which may be used with the present invention.
Figure 2:
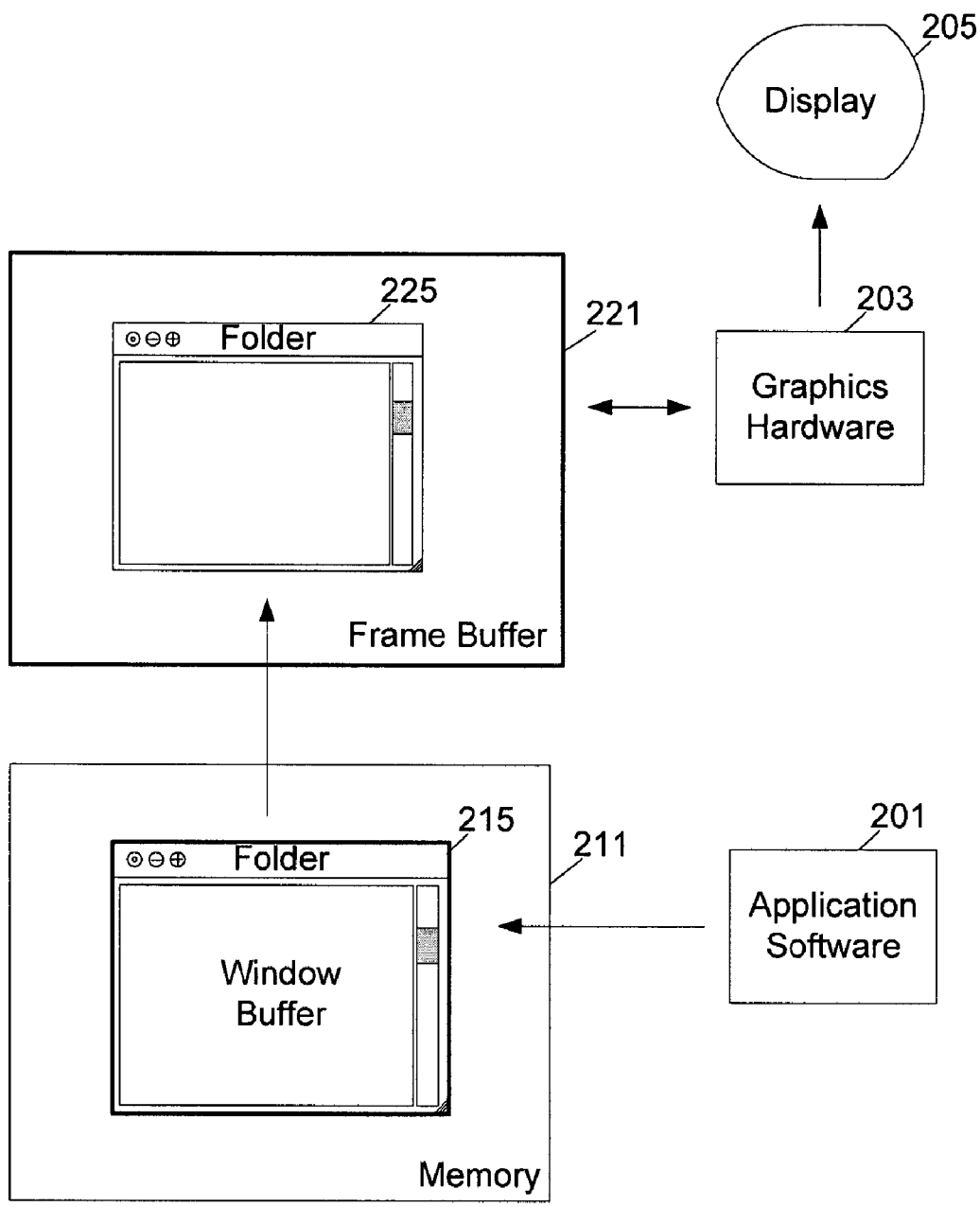
FIG. 2 illustrates a buffered window system.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices (e.g., microphones) which are well known in the art. Typically, the input/output devices 110 are coupled to the system through input/output controllers 109. In one embodiment, the display controller includes graphics hardware and a frame buffer which is coupled to a display device (e.g., a CRT [Cathode Ray Tube] or an LCD [Liquid Crystal Display] or an LED [Light Emitting Diode] display). The frame buffer is often a special form of random access memory (RAM) known as video RAM (VRAM) which is specially designed to drive a display device. The window buffers described herein are typically stored in a different portion of memory in the data processing system; the different portion is usually the volatile RAM 105. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to accelerate scrolling in a buffered window system using graphics hardware, since the graphics hardware can scroll a region in the frame buffer faster than copying the data for the corresponding region from the window buffer to the frame buffer.

In a buffered window system, both the frame buffer and the window buffer need to be scrolled to keep the frame buffer and the window buffer 'in sync'. Further, the synchronization operation (presenting the content in the window buffer to the frame buffer) typically happens at an undefined time after the application invokes a system call to scroll. The application may have produced drawings before and after the call to scroll. After the application makes a system call to flush, the window system starts to update the frame buffer according to the window buffer.

Figure 3:
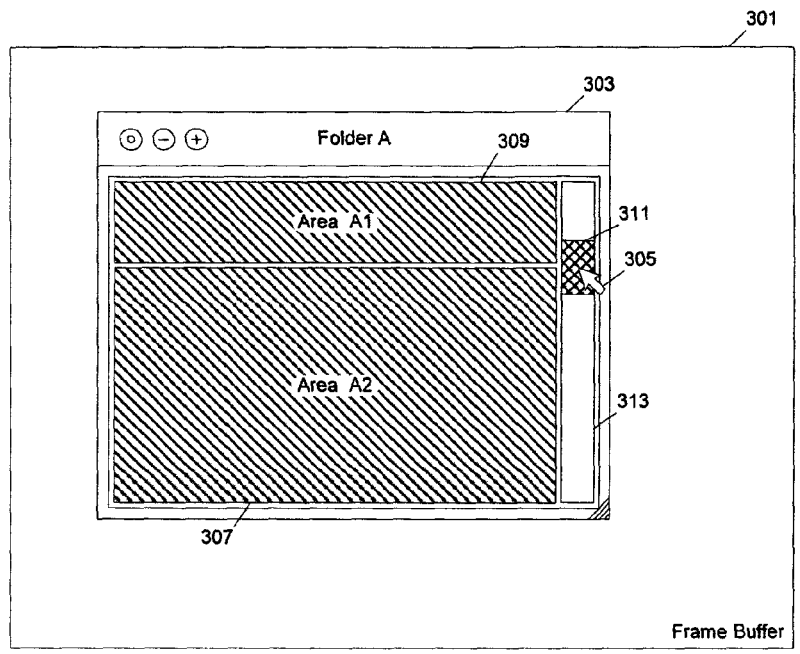
FIGS. 3-4 show a scenario to scroll a window in a non-buffered window system.
Figure 4:
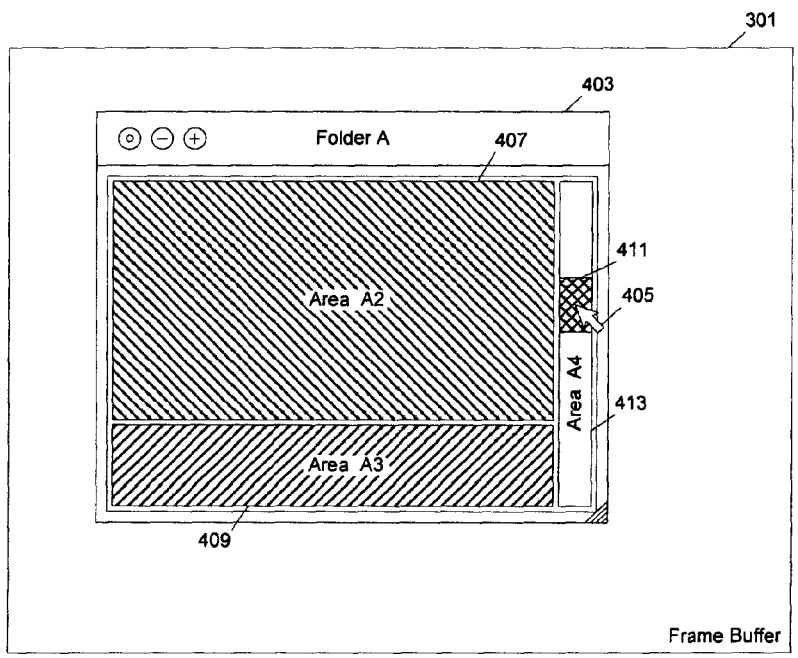

Therefore, at least one embodiment of the present invention seeks to identify scrollable regions from the records of the operations performed by the application and the geometries of the window as displayed in the frame buffer so that the scrollable regions in the frame buffer can be scrolled using graphics hardware in a synchronization operation. In one particular embodiment, a method to scroll information displayed on a display device by a data processing system includes: determining a scrollable region, which is to be scrolled, of a window in a frame buffer; moving said scrollable region in said frame buffer; flushing a portion of a window buffer, maintained for the window, to said frame buffer, said portion having a predetermined spatial relationship to the scrollable region. In this particular embodiment, graphics hardware, which controls the frame buffer, may move the scrollable region to cause scrolling on a display device. Typically, in this particular embodiment, only the portion of the window buffer is flushed from the window buffer to a corresponding portion of the window in the frame buffer. Also in this particular embodiment, the predetermined spatial relationship may be a contiguous relationship between the scrollable region and the portion flushed from the window buffer to the frame buffer. An example of a contiguous relationship is when the scrollable region abuts the portion flushed from the window buffer and the scrollable region is either vertically above or vertically below the portion. The region which is determined to be scrollable has such a state because the scrollable region in the window buffer for the window has not been changed since the last time that the region of the scrollable region was flushed from the window buffer to the frame buffer and because the scrollable region in the window has not been covered by another window (or otherwise not viewable). In other words, the scrollable region normally includes data in the frame buffer which is still viewable and is still valid (not dirty) but has moved (e.g., through a scroll) within the window to a new location relative to the frame of the window. For example, at least a portion of area A2 in FIGS. 3 and 4 is still viewable after a user scrolls the window (to effect the change from FIG. 3 to FIG. 4) and is still valid, and in this case the data for this portion does not need to be flushed from the window buffer—rather, it can be moved (e.g., scrolled) in the frame buffer (without flushing this portion), and only the dirty area (corresponding to new revealed area A3) is flushed from the window buffer, rather than all of the window buffer. The move performed in the frame buffer may be a jump without a scroll which is normally a sequential progression. It will be appreciated that the graphics hardware, in one exemplary embodiment, is often a collection of hardware logic which is specially designed to draw graphical objects (such as lines and other shapes), often in response to commands from the application software (or the system software) which specify the size and character of the objects. The graphics hardware will, in response to such commands, draw or render the graphical objects without requiring the application software to draw or render the objects. In at least one embodiment of the present invention, the graphics hardware scrolls (or moves, or copies) the content of a portion of a frame buffer (e.g., to show a scrolled portion of a window) in response to a command from the system software (or an application software) without involving the CPU of the system. Typically, the graphics hardware can scroll (or move, or copy) the contents in the frame buffer in a specialized operation much faster than a CPU or than using other operations. Such graphics hardware is known in the art for hardware accelerated scrolling operations and other graphical operations in non-buffered window systems.

Figure 5:
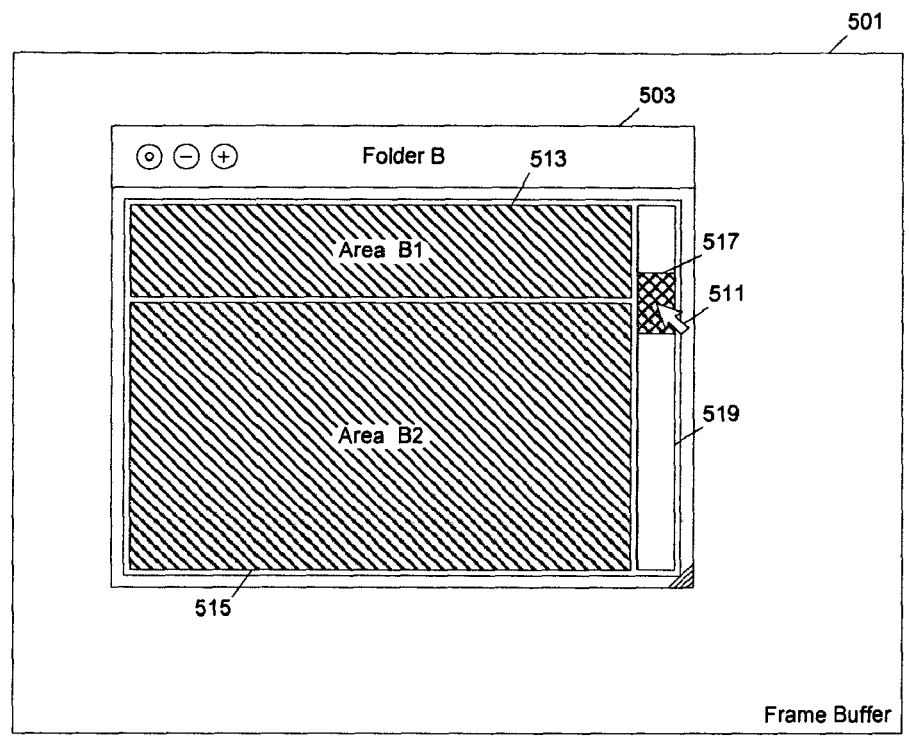
FIGS. 5-9 illustrate a scenario to scroll a buffered window according to one embodiment of the present invention.
Figure 5:
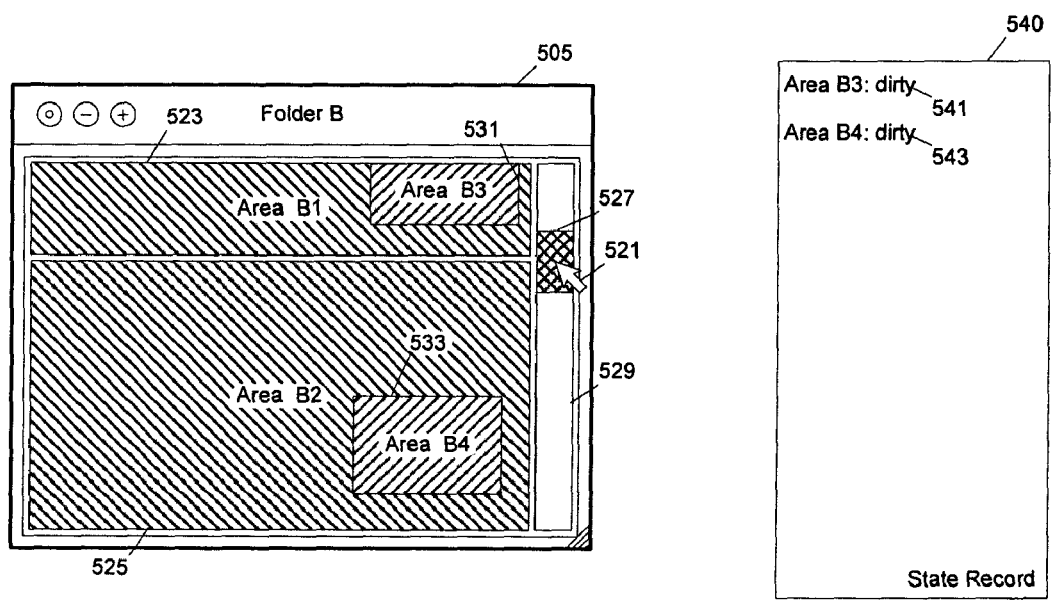
Figure 6:
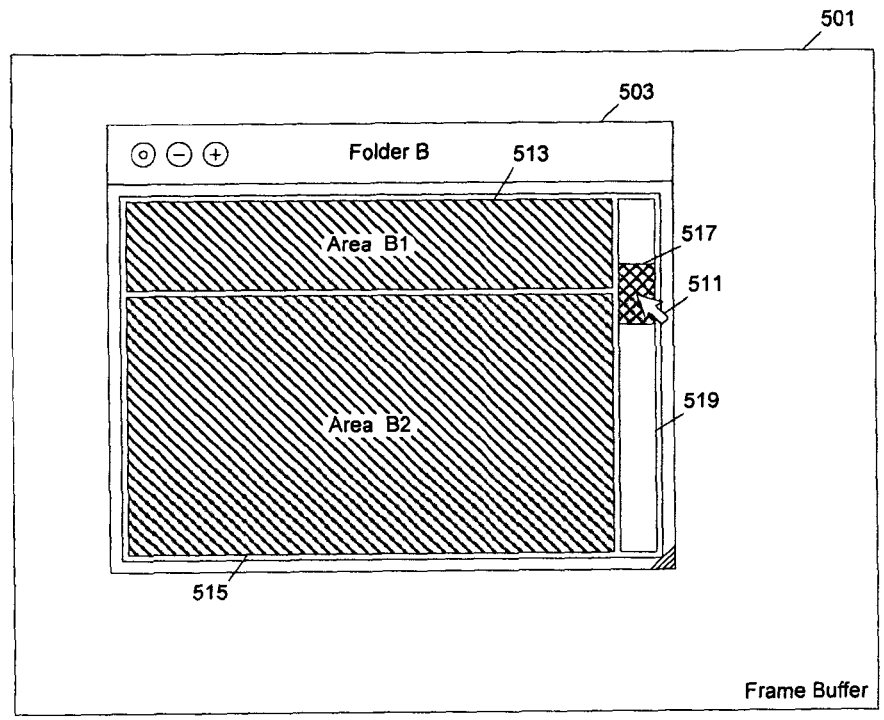
Figure 6:
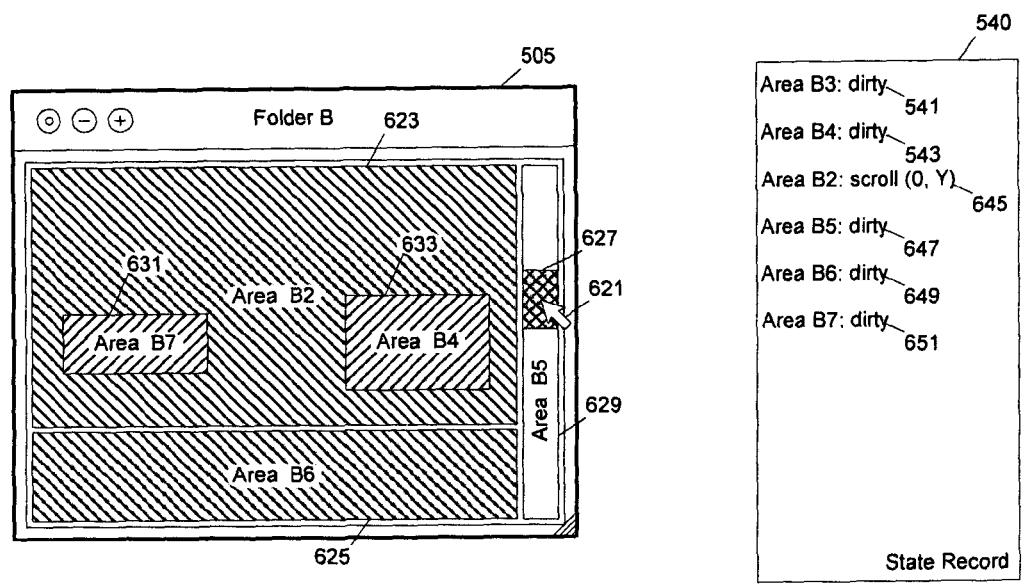
Figure 7:
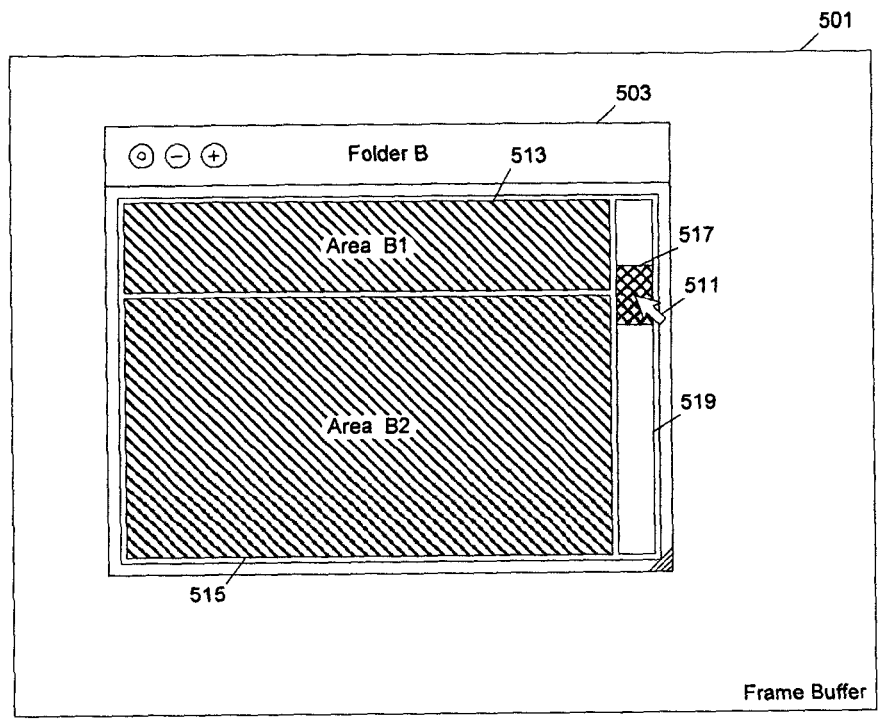
Figure 7:
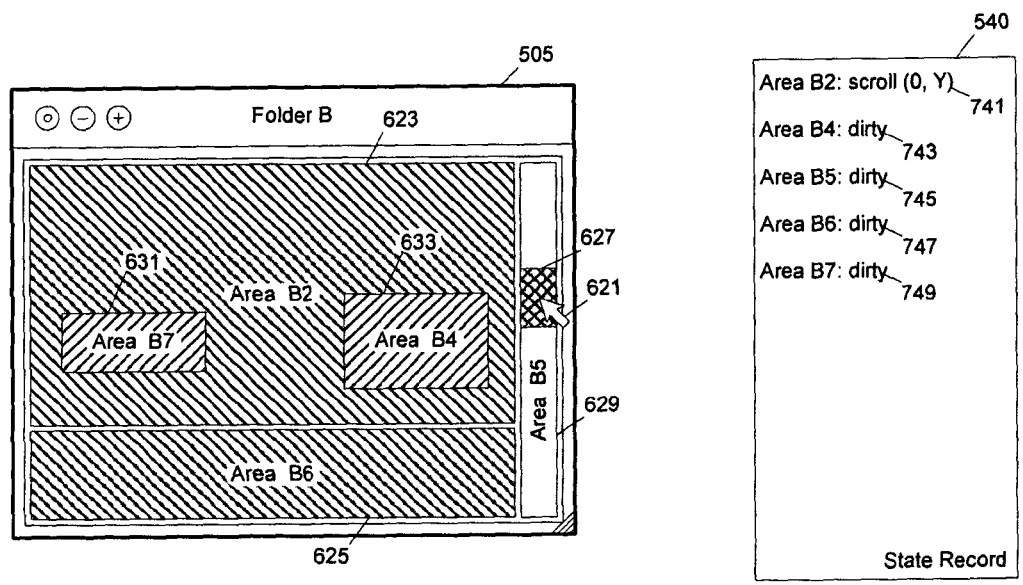

FIGS. 5-9 illustrate a scenario to scroll a buffered window according to one embodiment of the present invention. Frame buffer 501 has image 503 of the window, which is buffered on window buffer 505. In one embodiment, the frame buffer 501 is separate from the window buffer 505. For example, frame buffer 501 is VRAM memory in the display controller (e.g., display controller 108), which also includes graphics hardware, and the VRAM memory stores and maintains the displayed image so that a short persistence display, such as a CRT, can be refreshed. The window buffer 505 is in the "main system memory" which may be volatile memory 105 (e.g., DRAM). After the frame buffer is synchronized with the window buffer, the application further updates regions 531 and 533 in the window buffer. State record 540 stores in the memory the information about the operations (e.g., changes to the window's contents) performed by the application, which can be used later to selectively update the frame buffer. Entries 541 and 543 indicate that areas 531 and 533 are dirty. It is understood that each of entries 541 and 543 contains the information of the location and the size of the corresponding dirty region in which the window is updated since the last flush operation for synchronizing the frame buffer with the window buffer. In the example of FIG. 5, regions 513 and 515 in the frame buffer correspond to regions 523 and 525 respectively. Scroll bar 519 and thumb 517 in the frame buffer correspond respectively to scroll bar 529 and thumb 527 in the window buffer. Only areas 531 and 533 are dirty. Although FIG. 5 shows an example where the dirty areas are inside the area affected by the scroll operation (either in the source or in the destination area), it is understood that in general a dirty area can be at any location inside the window. Because the system does not know beforehand which area is going to be scrolled, it keeps track of all dirty areas for the window, some of which may be completely outside or partially outside the area affected by the scroll operation. The system may keep track of dirty areas by use of a bitmap which indicates changed and unchanged areas in a window, for example, a bit for a pixel (or a block of pixels) in the window buffer may indicate whether the pixel (or any of the block of pixels) has changed or not changed since the last time that the window buffer has flushed to the frame buffer.

When the input for cursor 521 to pull down thumb 527 is received, the application updates the window buffer to scroll the window. For example, when the thumb is moved from the position indicated by thumb 527 in FIG. 5 to the position indicated by thumb 627 in FIG. 6, the data for area 525 in FIG. 5 is moved to the location indicated by area 623 in FIG. 6. In one embodiment of the present invention, the window buffer is in video memory under control of the graphics hardware (e.g., Display Controller 108 in FIG. 1), which is used to scroll area 525 in FIG. 5 to area 623 in FIG. 6. In another embodiment of the present invention, the window buffer is in the system memory (e.g., RAM 105 in FIG. 1); and data for area 525 in FIG. 5 is copied to area 623 in FIG. 6. In other embodiments, the window buffer is in memory other than the system memory and the video memory. It is understood that the window buffer can also be partially in one type of memory and partially in another type of memory. After area 525 is scrolled, dirty region 533 is moved from the location in FIG. 5 to the location indicated by region 633 in FIG. 6. Since area 625 (B6) is newly revealed after scrolling, the application draws the contents for area 625. Similarly, scroll bar area 629 (B5) is also redrawn to show thumb 627 at the new position.

When the application makes system calls to perform these tasks, the window system records the information about the operations performed on the window buffer. Entry 645 in state record 540 is used to indicate that area B2 is scrolled. It is understood that entry 645 contains information about the location of the scrolled region and the amount of shift in position (e.g., the location and size of the region before scrolling and the amount of scrolling in the horizontal and vertical directions). Entry 647 indicates that the scroll bar region B5 is updated. After the scrolling operation, the application may further update area 631 (B7). For example, when a video clip or animation is shown in the window, the application may continuously update the window, generating dirty area such as area B7 before flushing the window. Thus, the system keeps track of the record of operations such that the drawing operations can be decoupled from the flush operations. The application software can draw the contents; and then, the application software instructs the system software (e.g., a windowing system) to flush the contents of the updated regions (dirty regions) to the frame buffer to present the updated image of the window. In one embodiment of the present invention, the application software performs the operations to draw on the window buffer through a system call to the system software. Thus, the system software can keep track of the record of the drawing operations without additional inputs from the application software; and, application software using system calls to perform drawings operations in a non-buffered window system can be used in a buffered window system of the present invention without modification or with minimum modifications. In one embodiment of the present invention, the system software can analyze the records to optimize the flushing operation (e.g., using graphics hardware to scroll, or copy, or move regions within the frame buffer, ignoring dirty regions that is scrolled out of the window). Thus, the drawing and flush operations can be decoupled; and, the entire scrolled region can be analyzed so that only a portion of it is flushed while another portion of it is updated using other means (e.g., using graphics hardware to scroll or copy to bring it to update).

In one example, the application calls the window system to present the window as shown in the window buffer to the screen after area B7 is updated. Dirty areas that appear before the scrolling record 645 are examined. Since dirty area B3 (531) is no longer on the visible portion of the window after the scrolling operation, no updating on frame buffer 501 is necessary for dirty area B3. Thus, record 541 can be deleted. However, dirty area B4 (633) is still on the window. Thus, the location of area B4 in the window after the scrolling is determined from the information about the scrolling operation. Since dirty area B4 scrolled with area B2, the new location of dirty area B4 can be easily determined. After the location of the dirty area B4 is updated, updating dirty area B4 may be performed after a scrolling operation in the frame buffer, as indicated by entries 741 and 743 in FIG. 7.

Figure 8:
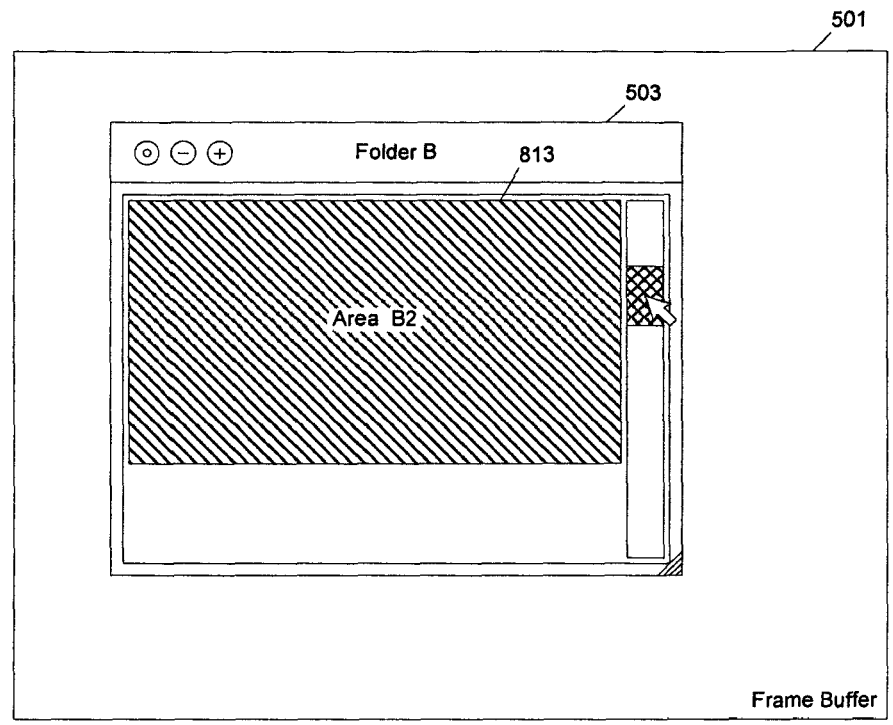
Figure 8:
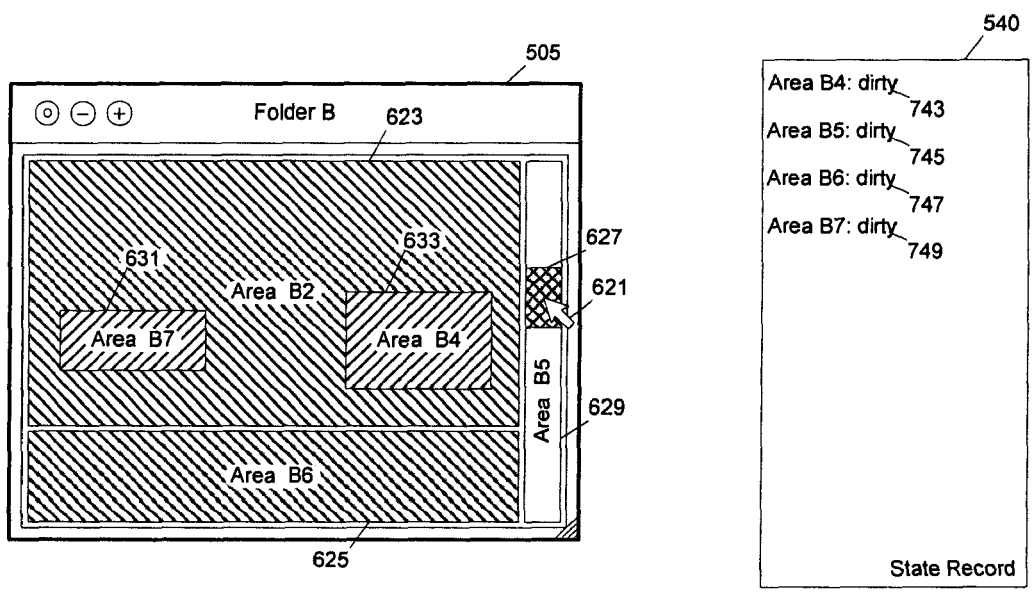
Figure 9:
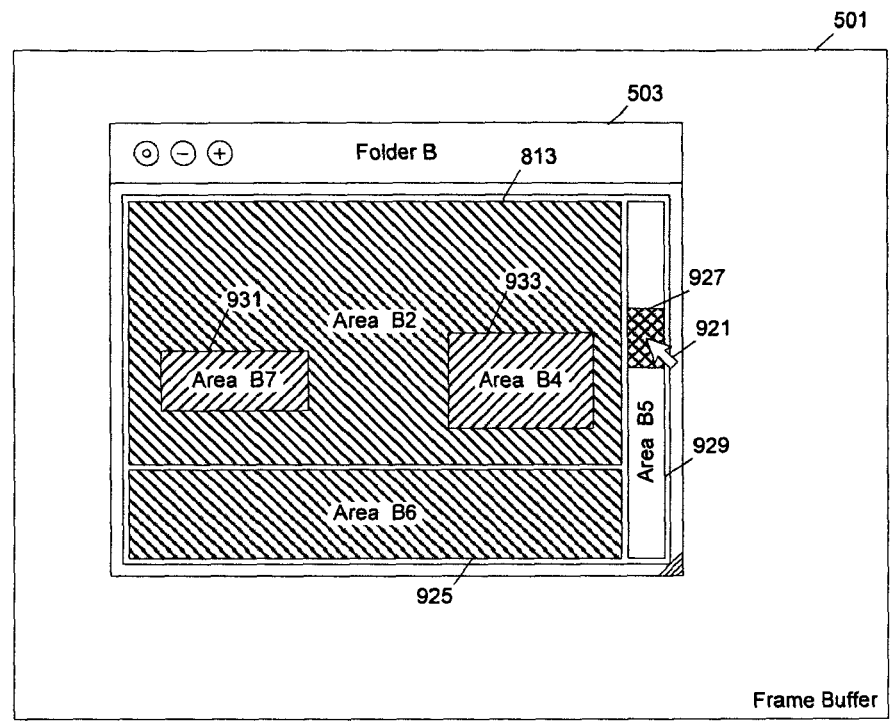
Figure 9:
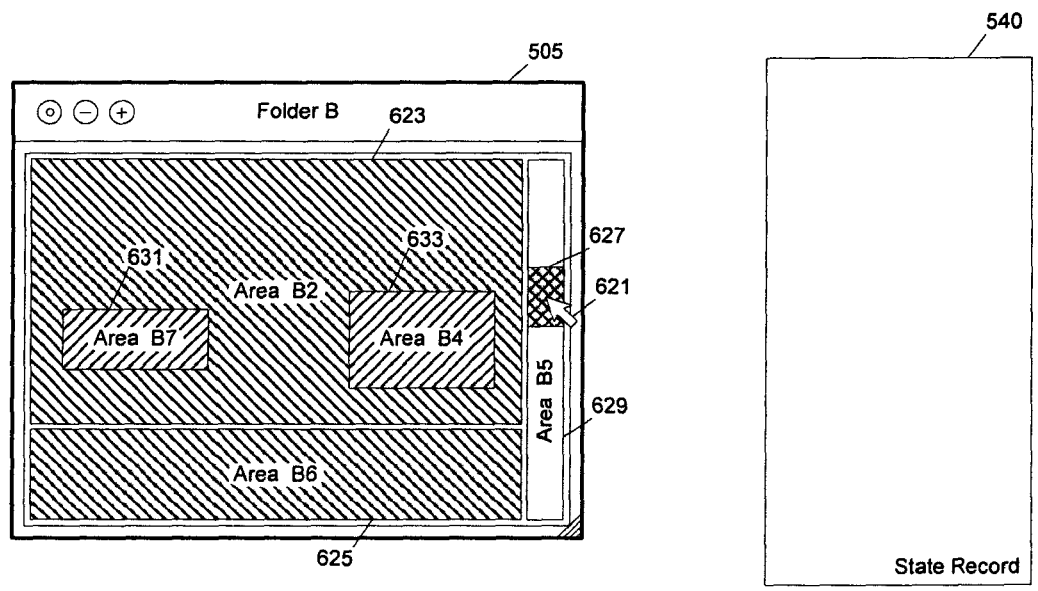

In one example, after it is determined that area B2 can be safely scrolled in the window buffer, the window system uses the graphics hardware to scroll area 515 in the frame buffer to the position as indicated by area 813 in FIG. 8. After the scrolling operation, only dirty areas as indicated by entries 743-749 in FIG. 8 need to be copied from the window buffer to the frame buffer. After the window system copies the data from areas 633 (B4), 629 (B5), 625 (B6) and 631 (B7) in window buffer 505 to the corresponding areas 933 (B4), 929 (B5), 925 (B6) and 931 (B7) in frame buffer 501, as shown in FIG. 9, the image of the window on the frame buffer is updated according to the image of the window on the window buffer. State record 540 then contains no entries, indicating that all dirty areas are flushed.

While FIG. 8 shows an example where entire region 813 is scrolled in the frame buffer by hardware, in other embodiments, region 623 is broken into smaller regions so that only the area outside the dirty areas 631 and 633 is scrolled. Thus, each area in the frame buffer is only updated once, either by scrolling in the frame buffer or by copying from the window buffer to the frame buffer. For example, area 623 is decomposed into non-intersecting rectangular sub-regions (e.g., by a mesh with lines extending from the boundaries of the dirty regions in area 623). The rectangular sub-regions that are inside area 623 but outside areas 631 and 633 are scrolled. The sequence of scrolling the sub-regions can be determined from the positions of the sub-regions and the direction of scrolling so that a scrolled sub-region does not destroy the data in the frame buffer for subsequently scrolled sub-regions. After the sub-regions are scrolled, the data for the dirty areas 631 and 633 are copied from the window buffer to the frame buffer.

In another embodiment of the present invention, data for the dirty areas inside the scrolled region, e.g., areas 631 and 633, are copied from the window buffer to the corresponding locations in the frame buffer before the entire region is scrolled using graphics hardware. The corresponding locations in the frame buffer are determined from the locations of the dirty areas in the window buffer and the scroll operation so that after being scrolled these corresponding locations are updated according to the corresponding dirty areas in the window buffer. However, if the corresponding locations are outside the source region for the scroll operation, these dirty areas cannot be flushed before the scroll operation. Since some dirty areas have to be updated after the scroll operation, updating some dirty areas before scrolling and other dirty areas after scrolling may not be as efficient as updating all dirty areas together after scrolling in some implementations. Thus, from this description, it will be apparent to one skilled in the art that different sequences of operations for scrolling in the frame buffer and for copying from the window buffer to the frame buffer can be used; and optimization can be performed based on the time required to perform various different tasks.

Although FIGS. 5-9 illustrate only a situation where the window is entirely visible on the frame buffer both before scrolling and after scrolling, methods of various embodiments of the present invention can also be used in situations where the window is only partially visible on the frame buffer before scrolling and/or after scrolling. The geometry of the image of the window displayed in the frame buffer may be different from the geometry of the window in the window buffer, since the window on the frame buffer may be partially off screen, or partially covered up by other windows. Further, the geometry of the window on the frame buffer before scrolling may be different from the current geometry of the window on the frame buffer after scrolling. The portion of the region scrolled in the window buffer that has valid data in the frame buffer can be scrolled using graphics hardware. The scrolled sub-region should be within the current geometry of the window in the frame buffer; otherwise, the scrolling operation will destroy data in the frame buffer for regions outside the window. Therefore, in identifying a sub-region for scrolling in the frame buffer, one embodiment of the present invention determines that: a) the source location of the sub-region of the window is within the previous geometry so that the sub-region in the frame buffer contains valid data for the window; and b) the destination location of the sub-region is within the current geometry so that the scrolling operation does not interfere with any region outside the current window in the frame buffer.

In general, different portions of a dirty area (or a scrolled area) may require different operations, such as scrolling or copying, in updating the frame buffer. For example, a dirty area generated before a scrolling operation may be partially off the window (or off the screen) after scrolling. Thus, only a portion of it needs to be copied from the window buffer to the frame buffer. In determining the regions for scrolling or copying, the dirty areas and the scrolled area(s) can be broken into sub-regions (e.g., by a rectangular mesh) and techniques for mapping or translating from a window buffer to a frame buffer may be used to copy the dirty areas from the window buffer to the frame buffer.

Figure 10:
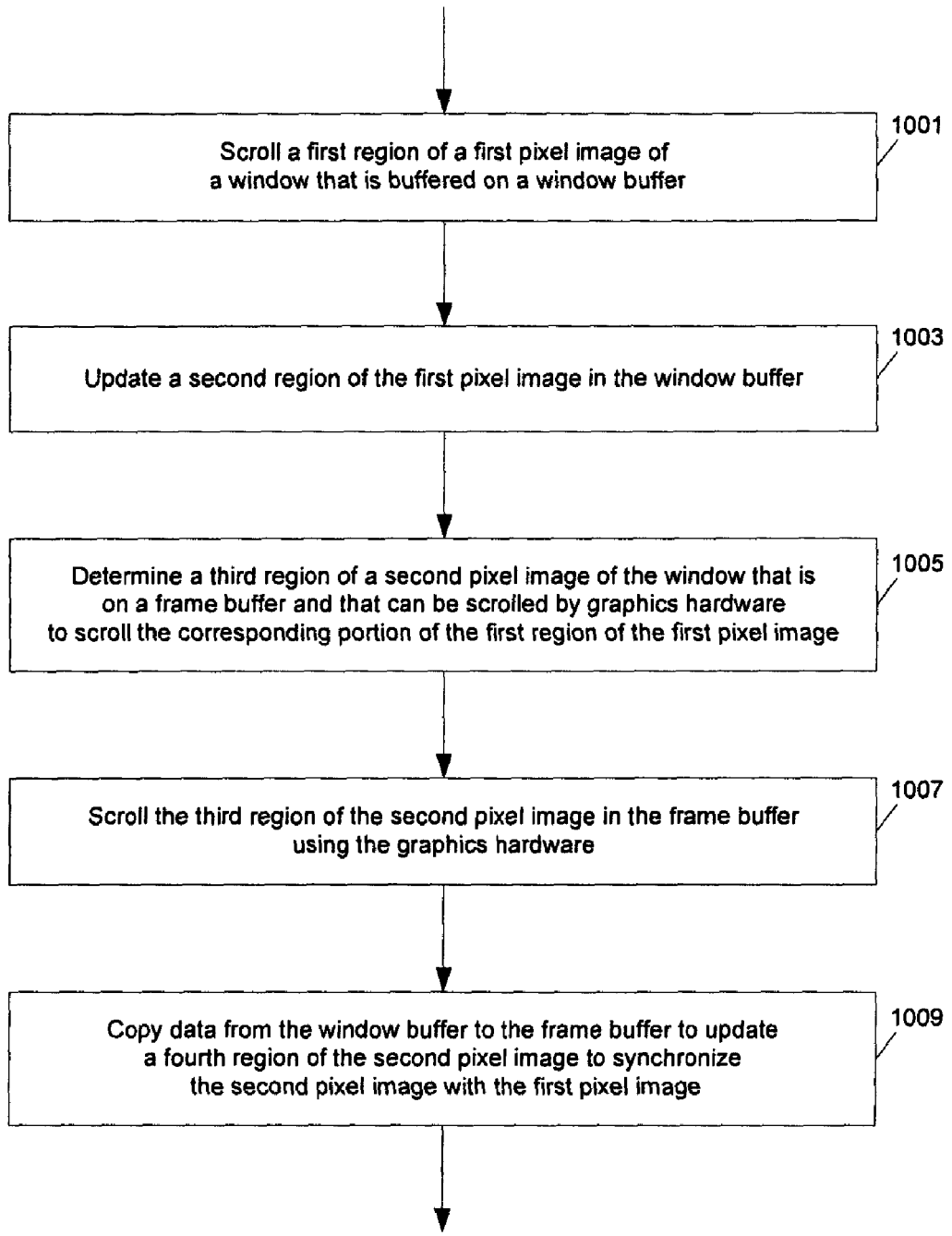
FIG. 10 shows a flow chart for a method to scroll a buffered window according to one embodiment of the present invention.

FIG. 10 shows a flow chart for a method to scroll a buffered window according to one embodiment of the present invention. After operation 1001 scrolls a first region of a first pixel image of a window, which is buffered in a window buffer, from one location to another, operation 1003 updates a second region of the first pixel image in the window buffer to show new contents. In one embodiment of the present invention, the window buffer is located inside a memory under control of graphics hardware; and the graphics hardware is used to scroll the first region of the window. In other embodiments, the window buffer is allocated in system memory (e.g., RAM 105 in FIG. 1); and the data for the first region is copied from the source location to the destination location to scroll the first region of the window. After operation 1005 determines a third region of a second pixel image of the window that is in a frame buffer and that can be scrolled by graphics hardware to scroll the corresponding portion of the first region of the first pixel image, operation 107 scrolls the third region of the second pixel image of the window in the frame buffer using the graphics hardware. The third region in the frame buffer corresponds to the first region in the window buffer. Operation 1009 copies data from the window buffer to the frame buffer to update a fourth region of the second pixel image to synchronize the second pixel image of the window in the frame buffer with the first pixel image of the window in the window buffer.

Figure 11:
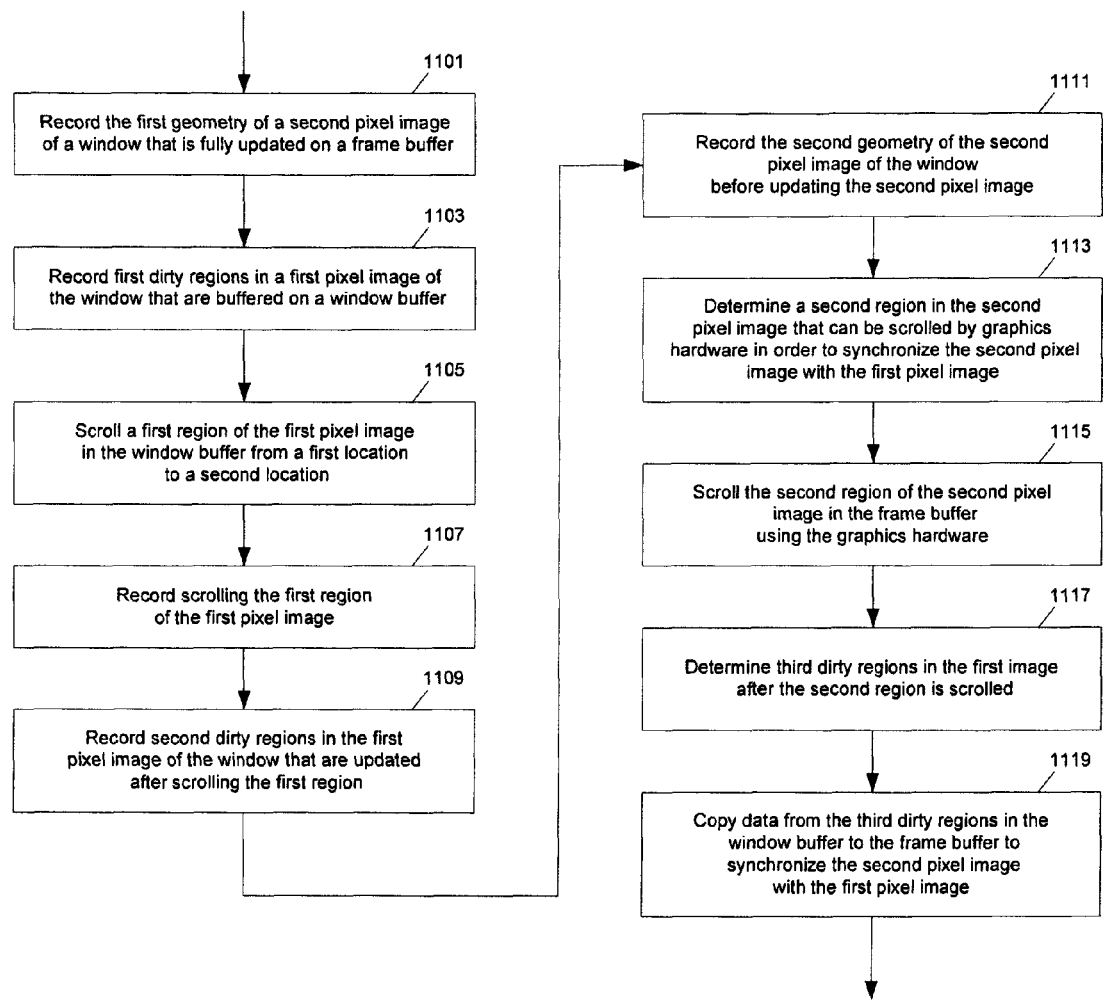
FIG. 11 shows a detailed flow chart for a method to scroll a buffered window according to one embodiment of the present invention.

FIG. 11 shows a detailed flow chart for a method to scroll a buffered window according to one embodiment of the present invention. The following sequence of operations is exemplary; and, other alternative sequences may be implemented. Operation 1101 records (e.g., generates a record of, or stores the information about) the first geometry of a second pixel image of a window that is fully updated in a frame buffer. From the first geometry a window system can determine valid data source regions for scrolling in the frame buffer. Operation 1103 records first dirty regions in a first pixel image of the window that are buffered on a window buffer. After operation 1105 scrolls a first region of the first pixel image in the window buffer from a first location to a second location, operation 1107 records scrolling the first region of the first pixel image. Operation 1109 records second dirty regions in the first pixel image of the window that are updated after scrolling the first region. Operation 1111 records the second geometry of the second pixel image of the window before updating the second pixel image in the frame buffer. After operation 1113 determines a second region in the second pixel image that can be scrolled by graphics hardware to synchronize the second pixel image in the frame buffer with the first pixel image in the window buffer, operation 1115 scrolls the second region of the second pixel image in the frame buffer using the graphics hardware. After operation 1117 determines third dirty regions in the first image after the second regions is scrolled, operation 1119 copies data from the third regions in the window buffer to the frame buffer to synchronize the second pixel image with the first pixel image.

Figure 12:
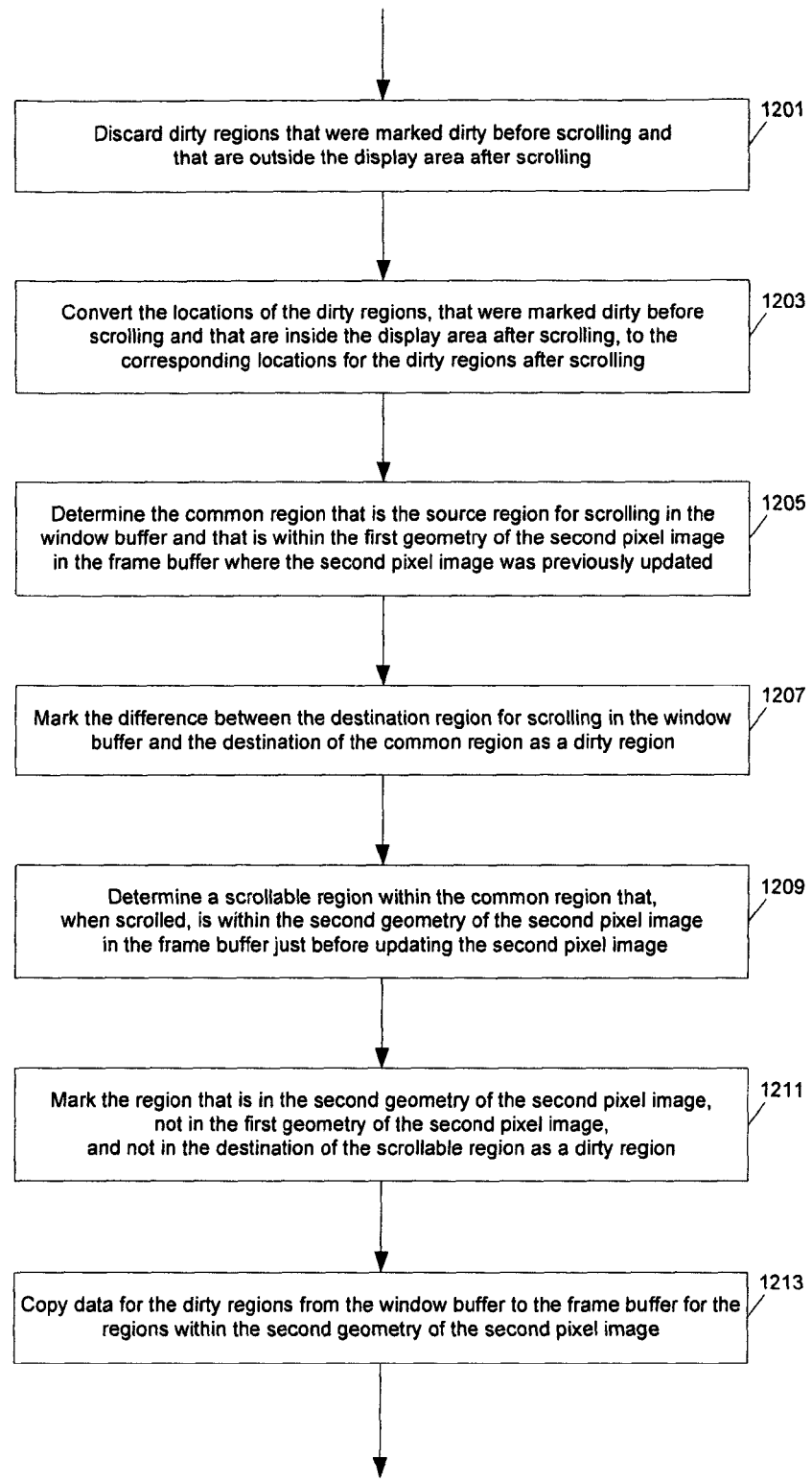
FIG. 12 shows a detailed flow chart for a method to synchronize a window buffer and a frame buffer according to one embodiment of the present invention.

FIG. 12 shows a detailed flow chart for a method to synchronize a window buffer and a frame buffer according to one embodiment of the present invention. Operation 1201 discards dirty regions that were marked dirty before scrolling and that are not a visible portion of the window in the frame buffer after scrolling. Operation 1203 converts the locations of the dirty regions that were marked dirty before scrolling and that are a visible portion of the window in the frame buffer after scrolling to the corresponding locations for the dirty regions after scrolling. Operation 1205 determines the common region that is the source region for scrolling in the window buffer and that is within the first geometry of the second pixel image in the frame buffer where the second pixel image was previously updated. Operation 1207 marks the difference between the destination region for scrolling in the window buffer and the destination of the common region as a dirty region. The frame buffer does not have valid data for this region; and the data for this region must be copied from the window buffer. Operation 1209 determines a scrollable region within the common region that, when scrolled, is within the second geometry of the second pixel image in the frame buffer just before updating the second pixel image. Thus, the destination location of the scrollable region is within the current geometry for the window in the frame buffer. Operation 1211 marks the region that is in the second geometry of the second pixel image in the frame buffer, not in the first geometry of the second pixel image, and not in the destination of the scrollable region as a dirty region. Such a region is newly revealed portion of the window in the frame buffer. Since the scroll operation cannot provide data for this region, data must be copied from the window buffer to the frame buffer to update this portion of the window. Operation 1213 copies data for the dirty regions from the window buffer to the frame buffer to update the regions within the second geometry of the second pixel image.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to scroll a buffered window on a data processing system, the method comprising:
   identifying a scrollable region and a non-scrollable region in a frame buffer for a
      scrolling operation to present content in a window buffer to the frame buffer, the window buffer allocated in a memory to store the content of at least one window, the frame buffer allocated in a separate memory of a graphics hardware coupled to the memory, the scrollable region and the non-scrollable region being viewable via the graphics hardware; and
   instructing the graphics hardware to scroll the scrollable region to move data of the scrollable region within the frame buffer without scrolling the non-scrollable region.

2. A method as in claim 1 wherein the frame buffer is located inside a video memory under control of the graphics hardware.

3. A method as in claim 1 further comprising:
   updating a location of the non-scrollable region from the window buffer after a region in the window buffer is scrolled.

4. A method as in claim 1 wherein the scrollable region is identified according to:
   a) a first geometry of a window previously updated in the window buffer, the graphics hardware displaying a display window as the window previously updated; and
   b) a second geometry of the window currently updated in the window buffer.

5. A method as in claim 4 wherein the scrollable region corresponds to a region scrolled in the window buffer and wherein the region is within the first geometry before being scrolled and within the second geometry after being scrolled.

6. A method as in claim 4, further comprising:
   identifying a region in the window buffer, the region corresponding to the non-scrollable region in the frame buffer, wherein the region is scrolled in the window buffer; and
   copying data for the non-scrollable region from the region in the window buffer to the frame buffer.

7. A machine readable storage medium containing executable computer program instructions which when executed by a data processing system cause said system to perform a method to scroll a buffered window on the data processing system, the method comprising:
   identifying a scrollable region and a non-scrollable region in a frame buffer for a scrolling operation to present content in a window buffer to the frame buffer, the window buffer allocated in a memory to store the content of at least one window, the frame buffer allocated in a separate memory in a graphics hardware coupled to the memory, the scrollable region and the non-scrollable region being viewable via the graphics hardware; and
   instructing the graphics hardware to scroll the scrollable region to move data of the scrollable region within the frame buffer without scrolling the non-scrollable region.

8. The machine readable storage medium as in claim 7 wherein the frame buffer is located inside a video memory under control of the graphics hardware.

9. The machine readable storage medium as in claim 7 wherein the method further comprises:
   updating a location of the non-scrollable region from the window buffer after a region in the window buffer is scrolled.

10. The machine readable storage medium as in claim 7 wherein the scrollable region is identified according to:
    a) a first geometry of a window previously updated in the window buffer, the graphics hardware displaying a display window as the window previously updated; and
    b) a second geometry of the window currently updated in the window buffer.

11. The machine readable storage medium as in claim 10 wherein the scrollable region corresponds to a region scrolled in the window buffer and wherein the region is within the first geometry before being scrolled and within the second geometry after being scrolled.

12. The machine readable storage medium as in claim 10 wherein the method further comprises:
    identifying a region in the window buffer, the region corresponding to the non-scrollable region in the frame buffer, wherein the region is scrolled in the window buffer; and
    copying data for the non-scrollable region from the region in the window buffer to the frame buffer.

13. A data processing apparatus, comprising:
    a memory storing executable instructions;
    graphics hardware including a frame buffer in a separate memory; and
    a processor coupled to the graphics hardware and the memory to execute the executable instructions from the memory for scrolling a buffered window, the processor being configured to:
      identify a scrollable region and a non-scrollable region in the frame buffer for a scrolling operation to present content in a window buffer to the frame buffer, the window buffer allocated in the memory to store the content of at least one window, the scrollable region and the non-scrollable region being viewable via the graphics hardware, and
      instruct the graphics hardware to scroll the scrollable region to move data of the scrollable region within the frame buffer without scrolling the non-scrollable region.

14. The apparatus of claim 13, wherein the frame buffer is located inside a video memory under control of the graphics hardware.

15. The apparatus of claim 13, wherein the processor is further configured to:

update a location of the non-scrollable region from the window buffer after a region in the window buffer is scrolled.

16. The apparatus of claim 13, wherein the scrollable region is identified according to:

a) a first geometry of a window previously updated in the window buffer, the graphics hardware displaying a display window as the window previously updated; and
b) a second geometry of the window currently updated in the window buffer.

* * * * *